July 9, 1963

D. H. SCHUSTER 3,096,592

EDUCATIONAL TESTING DEVICE

Filed Feb. 27, 1961

WITNESS
FRED BAUGUS

INVENTOR
DONALD H. SCHUSTER
BY
Talbert Dick & Farley
ATTORNEYS

July 9, 1963

D. H. SCHUSTER 3,096,592

EDUCATIONAL TESTING DEVICE

Filed Feb. 27, 1961

WITNESS
FRED BAUGUS

INVENTOR
DONALD H. SCHUSTER
BY
Talbert Dick & Barley
ATTORNEYS

United States Patent Office 3,096,592
Patented July 9, 1963

3,096,592
EDUCATIONAL TESTING DEVICE
Donald H. Schuster, 548 Forest Drive SE.,
Cedar Rapids, Iowa
Filed Feb. 27, 1961, Ser. No. 91,833
7 Claims. (Cl. 35—9)

This invention relates to a mechanical scoring device and more particularly to one for use in indicating the number of correct answers given by an individual in a "yes," "questionable" and "no" examination test.

The system of selecting possible answers to given questions is old. Such examinations are generally known as the 'yes" or "no" method and in recent years this method has grown greatly in general usage, due to the time saving factor and also due to the unquestioned accuracy of the correct answer. However while the examination period is relatively short, the grading of the same is time consuming. Some effort has been made to shorten the time to grade the examination by the use of master over-lays, but even by their use, the correct answers must be counted and recorded.

Therefore one of the principal objects of my invention is to provide an electricity actuated mechanical examination scoring device that automatically records and indicates the number of correct answers to a set of questions.

A further object of this invention is to provide a mechanical scoring device for selective answers to examination questions that hides accumulated score of correct answers from the one taking the examination.

A still further object of this invention is to provide a mechanical scoring machine for "yes" or "no" questions that permits easy changing from one set of questions to another set of questions.

A still further object of this invention is to provide an answer scoring machine that makes possible the rapid scoring of the answers.

A still further object of this invention is to provide a single unit machine having both questions and answer scoring phases.

Still further objects of my invention are to provide a mechanical question scoring machine that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
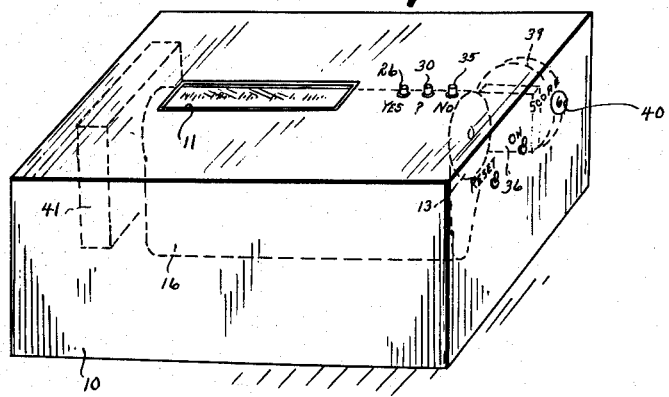
FIG. 1 is a perspective view of my device.

The principal features of my invention are a metallic drum, a question belt of non-electro-conductive material on the drum and having holes communicating with the surface of the drum, a plurality of depressable buttons capable of making electrical contact with the drum through the belt holes, a counter and electrical means associated with the depressable buttons for actuating the counter and rotating the drum. Neither the specific type of actuating means, nor the specific electric circuit are important to the invention in general, and in the drawings I merely show one type of wiring diagram for illustrative purposes.

Figure 2:
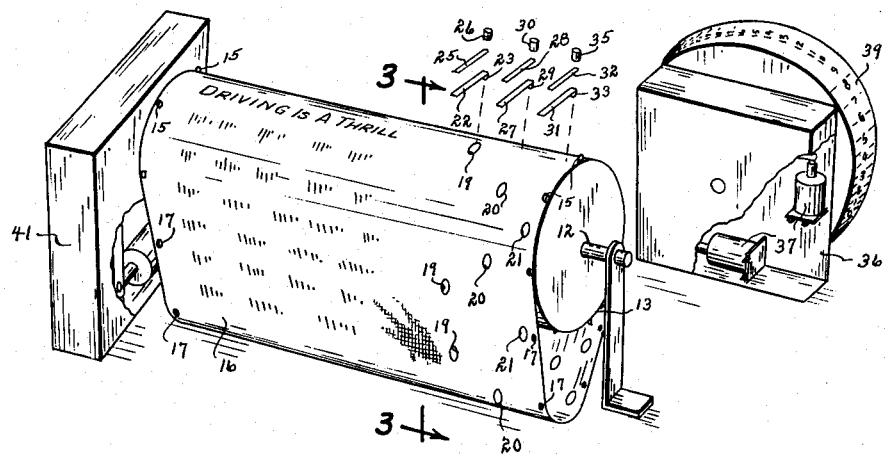
FIG. 2 is a perspective exploded view of the internal parts of the device.
Figure 3:
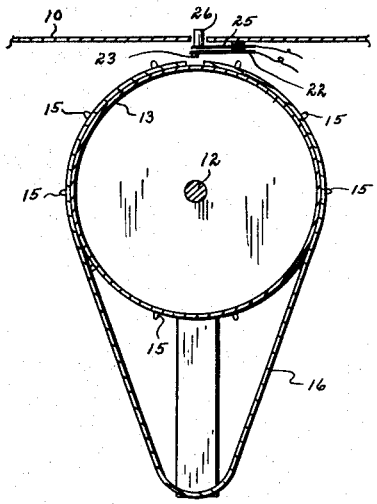
FIG. 3 is an enlarged cross-sectional view of the cylinder and belt portion of the unit.

Obviously, certain parts of the device must be hidden from the one taking the examination. Therefore most of the working parts are contained in a box housing 10. In the top of this box is an elongated slot sight opening 11. Rotatably mounted in the box 10 by any suitable means is a shaft 12 having the drum 13. This drum 13 and shaft 12 are of electroconductive material, and the upper longitudinal surface of the drum is directly below the sight opening 11. At each end of the drum are radially extending evenly spaced apart projections 15. The numeral 16 designates an endless flexible belt loosely embracing the drum and having at each of its side marginal portions, spaced apart holes 17 capable of being engaged by the projections 15, respectively, of the drum, as shown in FIG. 2. Imposed on the outer side of the belt is a plurality of questions. These questions are arranged in a row as shown in FIG. 2, and may be individually progressively observed through the sight opening 11, as shown in FIG. 1. At the right of each question is a hole extending through the non-electroconductive belt exposing the periphery of the metallic drum. If the hole is closely adjacent to the end of the question, it may be referred to as a "yes" hole and is designated by the numeral 19. If the hole is further to the right of the question, it may be referred to as a "questionable" hole and is designated by the numeral 20. If the hole is far to the right of the question it may be referred to as a "no" hole and is designated by the numeral 21. Operatively secured at one end to the under side of the top of the box 10 is a metallic leaf spring 22. On the lower free end of this spring is a contact lug point 23 capable of extending through a hole 19 in the belt and engaging the drum, when the spring is manually depressed. The numeral 25 designates a second metallic leaf spring operatively secured at one end to the underside of the top of the box and is insulated at its secured end from the secured end of the leaf spring 22. The spring 25 extends normally in spaced relationship above the spring 22 and has a push button 26 slidably extending upwardly through the top of the box 10, as shown in FIG. 1. This button 26 is the "yes" button. In like manner, the two metallic leaf springs 27 and 28 are installed, but with the contact lug point 29 on the spring 27 capable of passing through the belt holes 20, and the push button 30 on the spring 28 slidably extending upwardly through the top of the box 10, and acting as the "questionable" push button. Also in like manner, the two metallic leaf springs 31 and 32 are installed, but with the contact lug point 33 on the spring 31 capable of passing through the holes 21 in the belt, and the push button 35 on the spring 32 slidably extending upwardly through the box and acting as the "no" push button. Obviously it is necessary to have some means to keep score of correct answers, and I employ an ordinary common electric impulse counter, generally designated by the numeral 36. Such counters are progressively moved or rotated by an electro magnet means 37 and have a circular rotating band or wheel 39, having progressing numerals as shown in FIG. 2. The numerals on the member 39 are observable through a hole 40 in the right end of the box 10. Thus the one conducting the examination can observe the scoring, but the one taking the examination cannot. The machine is so wired, that if any push button 26, 30 or 35 is manually depressed and the answer is correct so that the contact point extends through the belt and electrically engages the drum, an electric current will be passed to the counter 36 and the member 39 will rotate one number. However, even if the wrong button is depressed and the counter not therefore electrically activated, it is still necessary that that particular button unit energize some type of electrical prime mover to rotate the drum to the next question on the belt. Again an electro-magnet motor, which I have generally designated by the numeral 41, is operatively secured by any suitable means to the shaft 12.

Figure 4:
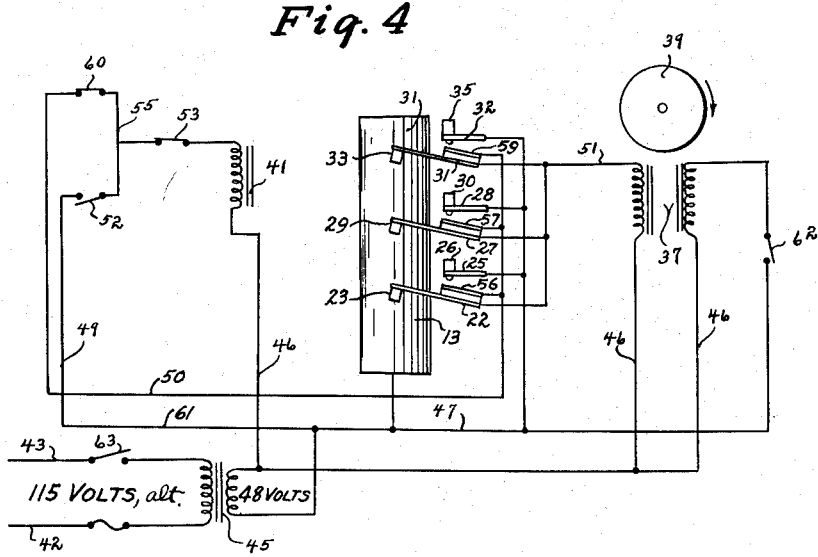
FIG. 4 is a diagrammatical showing of the wiring diagram of the device.

In FIG. 4 I show one illustrated wiring system. The lead in wires 42 and 43 are adapted to be in electrical communication with a source of energy. They are connected to the transformer 45 which materially reduces the voltage. The lead 46 extends from one pole of the transformer to the electro-magnet of the power means 41 and also to the two electro-magnets of the counter 36. The other lead 47 extends from the other pole of the transformer to the other side of the coil of the electro-magnet 37, to the drum 13 and to the leads 49 and 50. The lead 51 extends from the other end of the other coil of the electro-magnet means 37 to the metallic leaf springs 22, 27 and 31. The lead 49 extends to the other end of the coil of the electro-magnet power means 41. Imposed in the lead 49 is the off line switch 52 and the switch 53, which opens when the drum advance coil has been energized. The lead 55 extends from the lead 49 at a point between the two switches 52 and 53, and connects with one side of the three switch means 56, 57 and 59, respectively, the "yes," "?," and "no" switch means. Imposed in the lead 55 is the "on line" switch 60. The lead 61 connects the other side of the switches 56, 57 and 59 with the drum 13 and line 47. The numeral 62 designates a reset switch in the line 47. The numeral 63 designates an off-on switch imposed in the line 43.

The questions on the belt may be printed thereon, or a sheet bearing them may be glued to the belt. Questions, to be answered by "yes," "?," or "no," appear one at a time in the reading slot. The test-taking person, or testee, answers the question seen by depressing the appropriate push-button. His answer is instantly scored, and the next question rotates into position in the reading slot. After answering all questions, the total score of the testee is visible on the score-keeping counter.

To start a new testee, the reset button is pushed. This resets the score-keeping relay to zero. If the previous person had answered all the questions, question #1 should be visible in the reading slot. If not, depressing any answer button the required number of times will rotate the drum until question #1 appears; the reset button should again be pushed.

Scoring is done as follows: To the right of each question on the belt is punched a hole as herebefore described and which is in the track of the appropriate spring contact. This spring contact protrudes through the hole and touches the metal drum surface. If other springs are depressed with no adjacent holes, they are held from contacting the drum by the belt. If the pushbutton corresponding to the spring contacting the drum surface is depressed, and contact is made with the drum, a circuit is completed to energize the score-keeping means, and the score advances one point. Thus, pushing the "yes," "?" or "no" pushbutton, or a combination, will add one point to the person's score if the proper button is depressed.

The drum advances on line each time any one of the three answer pushbuttons is depressed. This is accomplished as follows: The second poles or sections of each pushbutton switch are wired in parallel. When any pushbutton is pushed, the drum advance coil is energized and the advance plunger pulls into the coil. As the plunger bottoms, or travels as far as possible, the advance coil is de-energized. The plunger returns to its off position and rotates the drum a certain number of degrees. The canvas belt had moved so that no question is visible (the off-line condition). The advance coil is again energized through the off-line switch of the drum stepping motor or relay, and the drum advances a second number of degrees. At this time new question is visible in the reading slot (on-line condition). This advancement of the question drum, even when an incorrect answer is executed, is due to the fact that the very first initial downward movement of a button closes the motor circuit. Thus if button 26 is depressed, the switch 56 will be momentarily closed and the circuit leads 55 and 46 will energize the motor 41, even if the pushbutton does not electrically contact with the metallic drum 13. The scoring drum 39 is only actuated when the circuit is made by the lead extending to the motor 37.

Some changes may be made in the construction and arrangement of my educational testing device without departing from the real spirit and purpose of my invention, and it is my intention to cover by my claims, any modified forms of structure or use of mechanical equivalents which may be reasonably included within their scope.

I claim:

1. In a mechanical question and score answering machine, a housing having an opening, an electro-conductive drum operatively rotatably mounted in said housing and adjacent its opening, a non-electro-conductive covering over at least the upper periphery of said drum, questions on said covering progressively observable through the opening in said housing when said drum is rotated, a contact point passageway through said covering adjacent some of said questions, a yieldable member operatively depressible by the person taking the test, an electrical circuit including means for rotating said drum, and a switch having two poles, one of said poles carried by said yieldable member, said switch adapted to be closed when said yieldable member is depressed whereby said drum is rotated, and a second electrical circuit including a second yieldable member, an electrically actuated indicating means and said drum, said second yieldable member adapted to make electrical point contact with said drum through a passageway in said covering, said first yieldable member when depressed adapted to depress said second yieldable member into electrical contact with said drum closing said second circuit and causing said indicating means to be operated.

2. The structure of claim 1 wherein said covering is in the form of an endless belt.

3. The structure of claim 3 wherein said indicating means is a cumulative numerical counter.

4. In a mechanical question and score answering machine, a housing having an opening, an electro-conductive drum operatively rotatable mounted in said housing and adjacent its opening, a non-electro-conductive belt embracing the upper portion of said drum, questions on said belt progressively observable through the opening in said housing when said drum is rotated, a first row of contact point passageways through said belt adjacent some of said questions, a second row of contact point passageways through said belt adjacent some other of said questions, a third row of contact point passageways through said belt adjacent some still other of said questions, said rows of passageways being spaced apart from each other, a yieldable member operatively depressible for each row of contact point passageways by the person taking the test, an electrical circuit including means for rotating said drum and a switch for each of said yieldable members, said switches each having two poles and being connected in parallel, one of said poles carried by said yieldable member, said switch adapted to be closed when said yieldable member is depressed whereby said drum is rotated, and a second electrical circuit including a second yieldable member for each row of contact passageways, an electrically actuated indicating means and said drum, said second yieldable member adapted to make electrical point contact with said drum through a passageway in its respective row of passageways in said belt, said second yieldable members being electrically connected in parallel, said first yieldable member when depressed adapted to depress said second yieldable member into electrical contact with said drum closing said second circuit and causing said indicating means to be operated.

5. The structure of claim 4, wherein said first yieldable member is vertically disposed above said second yieldable member, each of said first and second yieldable members secured together at one end thereof to said housing, and insulating material being disposed between said first and second yieldable members.

6. The structure of claim 5 wherein said indicating device has a cumulative numerical dial.

7. The structure of claim 6 wherein said belt is of continuous construction.

References Cited in the file of this patent

UNITED STATES PATENTS

| | | |
|---|---|---|
| 1,749,226 | Pressey | Mar. 4, 1930 |
| 2,030,175 | Le Fevre | Feb. 1, 1936 |
| 2,311,217 | Emmert | Feb. 16, 1943 |
| 2,911,741 | Boyer | Nov. 10, 1959 |